United States Patent [19]

Webster

[11] 4,249,808
[45] Feb. 10, 1981

[54] PHOTOPLOTTING IN COLOR WITH EXPOSURE BUDGETING

[75] Inventor: Ronald B. Webster, Ellington, Conn.

[73] Assignee: The Gerber Scientific Instrument Company, South Windsor, Conn.

[21] Appl. No.: 65,558

[22] Filed: Aug. 10, 1979

[51] Int. Cl.³ .............................................. G03B 41/00
[52] U.S. Cl. ......................................... 354/4; 355/32
[58] Field of Search ............... 354/4; 355/32; 364/520

[56] References Cited

U.S. PATENT DOCUMENTS 3,142,528  7/1964  Stafford et al. ..................... 355/32 X
3,610,119  10/1971  Gerber et al. ............................ 354/4

Primary Examiner—John Gonzales

Attorney, Agent, or Firm—McCormick, Paulding & Huber

[57] ABSTRACT

A method of plotting in color with a photoplotter and color film employs a technique of budgeting the amount of exposure in each of the color sensitive emulsion layers of the film. An optical exposure head in the plotter projects a beam of colored light onto the film and relative movement of the film and head causes a spot of light generated by the projected beam to move to various positions on the film and expose the film in accordance with the color components of the beam. The optical head changes the color components to produce beams of different colors and exposes the film accordingly. The total exposure of each emulsion layer by all of the color components is limited to the exposure capacities of the layers by restricting the colors that are produced by the projected beams.

21 Claims, 7 Drawing Figures

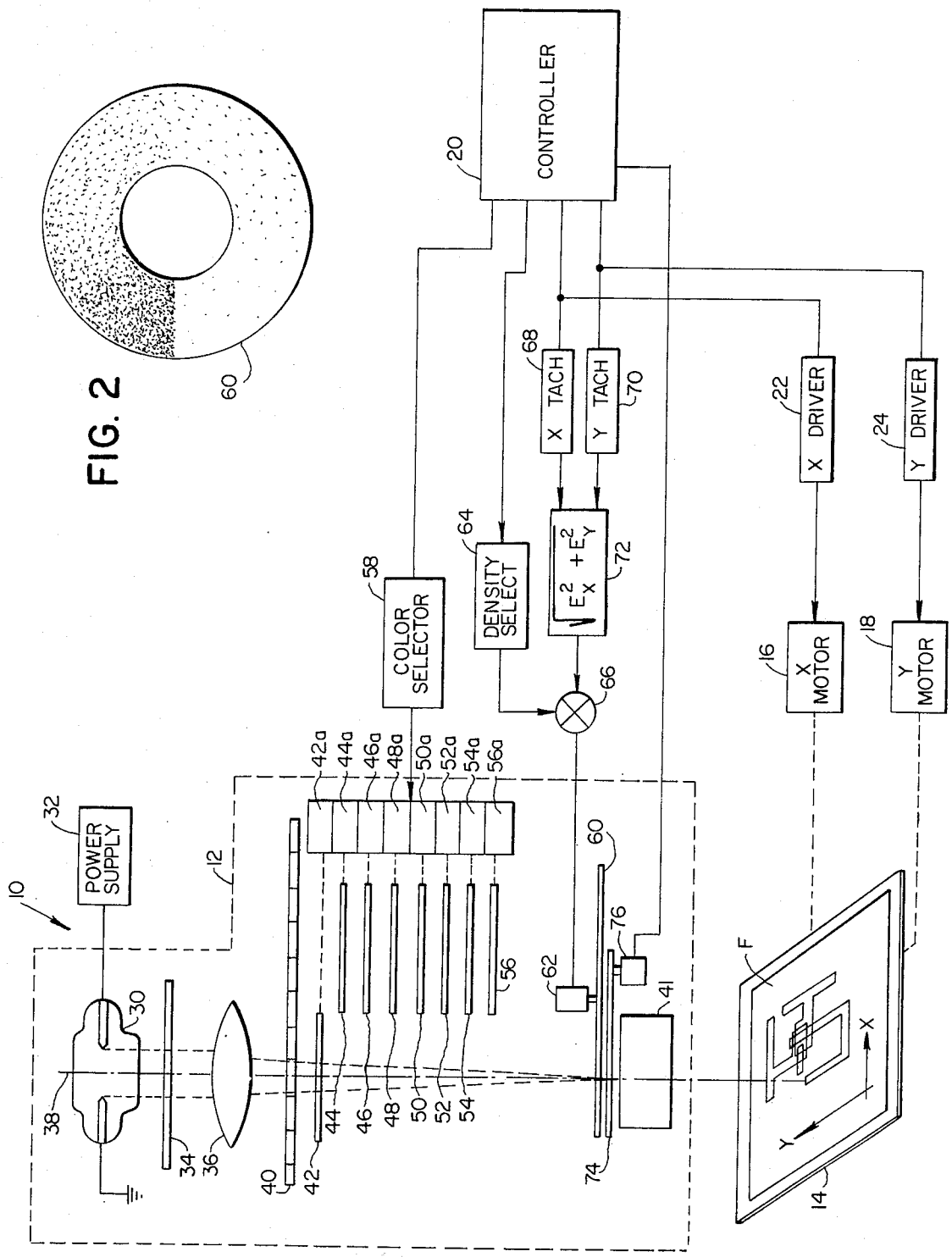

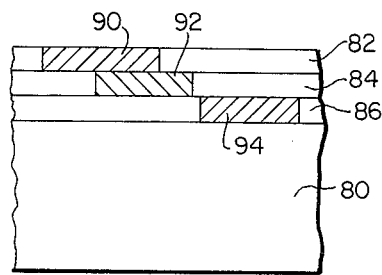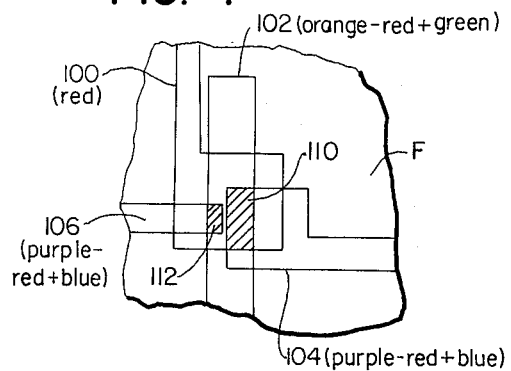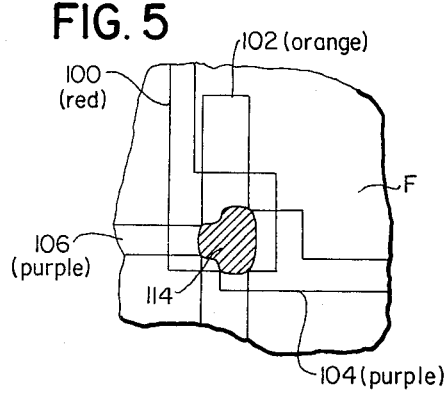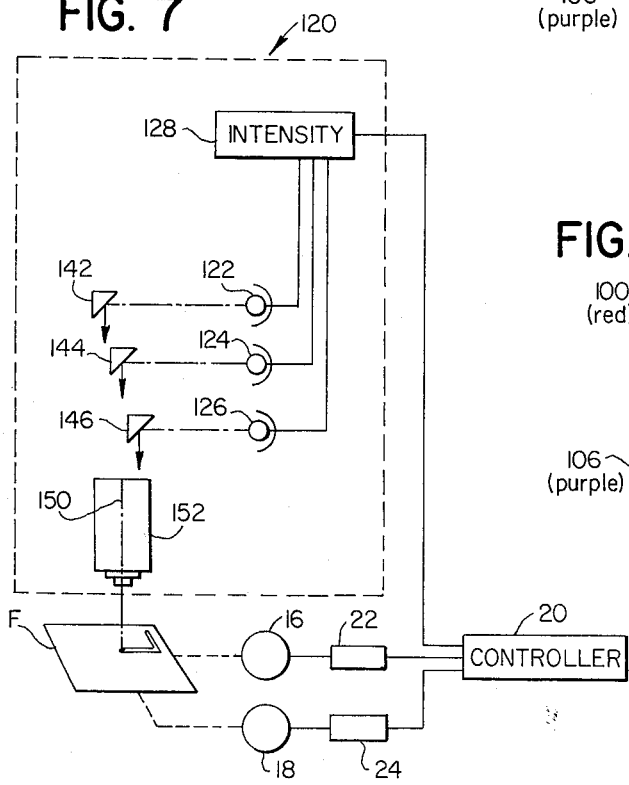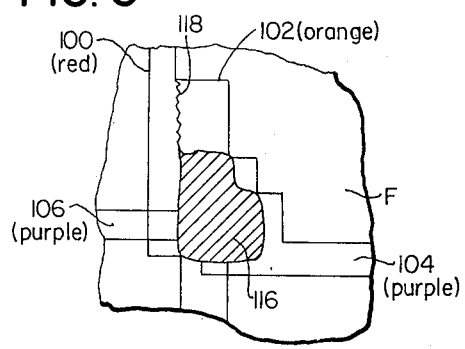

PHOTOPLOTTING IN COLOR WITH EXPOSURE BUDGETING

BACKGROUND OF THE INVENTION

The present invention relates to a method of plotting in color with photoexposure heads and a color film having maximum exposure capacities in each of the color sensitive emulsion layers. More particularly, the present invention relates to a method of of controlling the color exposure of the film in a plotting operation to produce sharp, clear and accurate plots in multiple colors.

In a co-pending application Ser. No. 038,452 filed May 14, 1979 and entitled "COLOR PLOTTING DEVICE" by Webster and Larsen, a photoplotter is disclosed for producing colored plots on a photographic film having color sensitivity. An optical exposure head in the plotter projects beams of light having different or changeable color components onto the photosensitive surface of the film, and various emulsion layers in the photosensitive surface record the projected colors. Drive motors within the plotter move the spot of light generated by the colored beams over the film surface and expose the film in accordance with the color components found in the beam and spot.

The color plotting process may be advantageously employed in the fields of cartology, microcircuit manufacturing and other fields of use. Color plotting adds new dimensions to the field of plotting that were not previously available, and correspondingly increases the end uses of a plotter by many magnitudes.

The exposure of a color film in a plotting process differs in at least one major respect from the exposure of the same film through a camera shutter. In a camera all of the film is exposed in a single instant when the shutter is momentarily open. The degree of exposure of the film is controlled by preset aperture and time settings so that no portion of the film emulsions receives more exposure than can be tolerated for accurate and clear presentation of the color image when developed. The settings to control exposure are based upon the general level of light reflected from the object being photographed when illuminated by artificial or natural light.

In a photoplotter, however, plotting is carried out in low light level conditions, and the spot of light produced by a color beam projected onto the film exposes a very limited area at any instant in time. Only by moving the spot over the film does one progressively expose a complete plot pattern. The ability to move the light spot over the film surface adds flexibility to the plotting process and allows any portion of the photosensitive surface to be exposed to the exclusion of the rest of the film. Additionally, any one position on the film surface can be exposed several times by repetitively locating the spot over that position with the same or different colors providing exposure. As a result of the flexibility in both the movement of the spot and the color composition of the spot, control of the exposure presents new problems not encountered in camera photography or photoplotting with black and white film.

First of all, one advantage of a color plot is that a different element in the plot can be represented by different colors and the elements can overlie one another without loss of discrimination. Generating overlying colors means that one position of the film is exposed two or more times by passing the projected light beam over that position repeatedly with the same or different color components in the beam. When the spot of light generated by the projected beam exposes the film on two or more occasions, the possibility of over-exposure is presented even though the intensity of each light spot at a position is within the original tolerance of the film emulsions.

Additionally, color films regardless of their types include on the photosensitive surface three different emulsion layers which record the color components of a colored light spot in terms of the primary color constituents, that is, those primary colors from which all other colors may be defined. Typically a color film has one emulsion layer which records all colors having any red constituents, another emulsion layer for recording all blue constituents, and a third emulsion layer for recording all green color constituents. The primary colors red, blue and green may be added together in equal proportions to form white light, and for this reason are known as the additive primaries. In practice the exposed and developed film defines the recorded colors in terms of the subtractive primary colors cyan, magenta and yellow which are absorbed as dyes in the respective emulsion layers during the developing process. The subtractive primary colors cyan, magenta and yellow are the complements respectively of the primary colors red, green and blue, and are called subtracprimaries, because in filters they collectively absorb all colors from white light. In color negative reversal film the cyan dyes are used to record red components, magenta dye for green components and the yellow dye for blue components. As a result the processed film displays images which are complementary in color to the recorded object (plot) and negative in tone value. The same dyes are used in positive direct film but in the exposure and developing process the dyes of the subtractive primaries are rejected rather than fixed in the respective emulsion layers.

The consequence in plotting of recording all colors in terms of the three primaries is that any one of the emulsion layers may be called upon to record the colors in excess of its capacity, that is, an emulsion may be overexposed when the same or similar colors are repeatedly exposed at the same position on the film surface. When the emulsion capacity is exceeded, the colors "bleed" into the surrounding area of the emulsion and produce images which are not clear or accurate representations of the plot pattern. In cases of excessive exposure in one or more of the emulsion layers, the images are not only blurred but also are presented in colors which are not true.

It is, accordingly, a general object of the present invention to provide a method of plotting in color which is accurate and presents clear and true representations of a plot pattern. It is also an object of the invention to provide a method of plotting in color without exceeding the color or exposure capacities of the emulsions recording the colored plot pattern.

SUMMARY OF THE INVENTION

The present invention resides in a method of plotting in color with exposure budgeting for each of the emulsion layers recording the color components of the plot. The method is carried out in a photoplotter having means for exposing the color plot on a color film.

The method includes the step of generating a spot of radiant energy on the photosensitive surface of a color film. The spot of radiant energy, for example, would be the light spot produced by projecting the beam of light from an optical exposure head in the photoplotter onto the photosensitive surface of the film. The film has emulsion layers which are variously sensitive to exposure by the color components of the spot and which record those components for subsequent viewing in the developed film.

The spot of radiant energy and the color film are moved relative to one another with prescribed motions that cause the spot to move to different positions on the photosensitive film surface in accordance with the desired geometry of the plot. In the photoplotter such relative movement is generated by drive motors in response to motor command signals which are either prerecorded or processed on-line by suitable data processing equipment and a program source.

The color components of the radiant energy in the generated spot are changed to expose different colors in the photosensitive emulsion layers of the film at the different positions over which the spot is moved by the plotter. For example, color filters of various types may be inserted into the beam of light generating a spot of radiant energy on the film surface.

The exposure of the various emulsion layers by the color components in the generated spot is limited at those positions where the film is exposed more than once with the same or different colors. The limit of exposure is selected in accordance with the capacity of the emulsion layers to accept such exposure so that an accurate representation of the color plot is presented in both geometry and color. The capacity of the emulsion layer is fixed by the particular film being used, and the step of limiting the exposure below that capacity is accomplished by analyzing the color components of the radiant energy spots, in terms of the primary color constituents recorded in the respective emulsion layers. Should the capacity of any one of the emulsion layers be exceeded, adjustment of the color components to bring the exposure within the capacity is made.

By budgeting the colors so that the exposure capacity of each layer in the color film is not exceeded, an accurate and clear representation of the plot is obtained. There is no bleeding of one color beyond the bounds of a given element in the plot, and the color definition remains true throughout the plot.

BRIEF DESCRIPTION OF THE DRAWINGS

FIG. 1 is a schematic illustration showing one embodiment of a photoplotter for carrying out the color plotting method of the present invention.

FIG. 2 illustrates a variable density filter utilized in the photoplotter in FIG. 1.

FIG. 3 is a fragmentary cross sectional view of a typical color film.

FIG. 4 is a fragmentary sample of a color plot properly exposed in accordance with the present invention.

FIG. 5 is another fragmentary sample of the color plot in FIG. 4 in an over-exposed condition.

FIG. 6 is still a further fragmentary sample of a color plot in a greatly over-exposed condition.

FIG. 7 is a schematic illustration of still a further photoplotter for carrying out the present invention.

DESCRIPTION OF THE PREFERRED EMBODIMENTS

FIG. 1 illustrates a photoplotter, generally designated at 10, for producing color plots on a photosensitive color plate or film F in response to preprogrammed command signals derived from a programmed controller 20. The film F is fixedly positioned on a flat work surface of a movable table 14 located under the optical exposure or photohead 12 of the plotter. The table with the film is movable relative to the photohead in the illustrated X- and Y-coordinate directions by means of corresponding X-and Y-drive motors 16 and 18 respectively. The programmed command signals from the controller 20 are applied to the drive motors 16 and 18 through amplifiers or drivers 22 and 24 respectively. The programmed commands may be digital or analogue, and are determined by the program stored in the controller 20 so that a predefined plot in appropriate colors is exposed on the film when the relative movement of the film and plotting head takes place.

Within the plotting head 12 a source 30 of polychromatic light is energized by a power supply 32, and in one form the source is a xenon lamp which may be energized in a continuous, intermittent or pulsed mode as desired. The light from the source 30 passes through a color compensating filter or filters 34 which corrects or balances the color components of the source for a given film so that colors are reproduced in the exposed film with proper balance and accuracy.

The balanced polychromatic light then passes through a converging lens 36 to define a beam of light directed along an axis 38 toward the color film F on the table 14. The lens 36 is normally comprised of a plurality of optical elements but is illustrated as a single lens for simplicity.

While the light from the lens 36 is still diffused, it passes through an aperture slide 40 which contains a plurality of apertures positioned in side by side relationship for movement individually into the light beam. The apertures in the slide have a variety of sizes and shapes in order to define the size and shape of a spot projected by the light beam through an objective lens 44 onto the photosensitive surface of the color film F. The size and shape of the spots determines the area of the film surface which is exposed, and by moving these spots across the film surface continuous lines and other shapes are generated. Also, momentary flashing of the light source 30 allows individual areas of the film surface to be exposed with configurations that are determined by the apertures in the slide 40. To change the aperture in alignment with the beam and correspondingly the spot projected onto the photosensitive surface of the film, a separate servo motor (not shown) may be utilized or, alternatively, the relative movement of the photohead 12 and the table 14 may provide adjustment of the aperture plate as described in greater detail in co-pending U.S. application Ser. No. 833,374 filed Sept. 14, 1977 by the assignee of the present invention, now U.S. Pat. No. 4,209,239.

After passing through the aperture plate 40, the polychromatic light beam passes adjacent a pack of color separation filters 42–56. Each filter in the pack allows only certain color components of the polychromatic light to pass along the axis 38 to the photosensitive surface of the film F. In one embodiment of the invention each filter 42–56 has a different color characteristic and therefore transmits different color components of the beam. In this respect reference to color characteristics is intended to include the color hue, saturation and lightness which are independent parameters of all colors.

Each filter 42–56 has an associated actuator 42a–56a that allows the associated filter to be pivoted or translated into the light beam as shown for example by filter 42, or held out of the light beam as shown for example by the remaining filters. The actuators may be operated individually or collectively to put one or more of the filters into the light beam and, therefore, a multitude of light beams of different colors or having different color components can be generated and projected onto the film F. The particular color of the beam projected onto the film is determined within the program of controller 20 and causes a suitable command signal to be transmitted to the appropriate actuators 42a–56a through a color selector circuit 58. If a white spot of light is desired on the film surface, the selector circuit may retract all of the filters so that the polychromatic beam passes unmodified to the film surface with all of the color components transmitted through the aperture plate 40.

The beams generated along the axis 38 also pass through the periphery of a neutral density filter 60 shown in greater detail in FIG. 2. The neutral density filter attenuates all of the color components in the light beam in equal degree and therefore controls the intensity of the light in the spot on the film. The attenuating characteristics of the filter 60 in FIG. 2 vary circumaxially about the disc so that different degrees of intensity can be obtained by rotating the disc from one position to another. For this purpose the disc is mounted for rotation on a small servomotor 62 which is controlled by signals originating in the controller 20. One of the signals derived from the plotting program is applied to a density selector circuit 64 which amplifies the signal and transmits the signal through a summing junction 66 connected to the servomotor 62. The density signal applied to the selector circuit 64 allows the saturation of the color produced by the separation filters 42–56 to be changed.

Since the exposure of color film is also sensitive to the time or interval during which light impinges on the photosensitive surface, the positioning of the neutral density filter 60 is also controlled by another signal proportional to the speed of relative movement between the film and plotting head 12. The speed signal is derived by an X-axis tachometer circuit 68 and a Y-axis tachometer circuit 70. The tachometers determine the speed of movement from the displacement signals supplied to the motor drivers 22 and 24 respectively, and the total relative velocity of the film and plotting head is calculated in accordance with the Pythagorean Theorem in the resolving circuit 72. Thus the signal generated by the circuit 72 represents the plotting speed and such signal controls the servomotor 62 so that the exposure of the film surface is uniform regardless of the speed at which the light beam scans the surface of the film.

The photohead 12 further includes a shutter 74 and actuating motor 76 for moving the shutter in and out of the light beam. The purpose of the shutter is to completely block the light beam when no exposure of the film surface is desired such as at the beginning and end of a plotting operation or when an intentional interruption or break exists in the plot pattern. Like the other control components in the plotting head 12, the shutter and motor 76 receive command signals from the controller 20 in accordance with the plotting program.

The photoplotter 10 described above merely represents one of a number of photoplotters that may be used to generate a color plot pattern on the film F. For a more complete description of the plotter and other plotters capable of carrying out the plotting method of the present invention reference may be had to the copending application Ser. No. 038,452 filed May 14, 1979 referenced above.

A complete understanding of the present invention can not be had without understanding the general structure of films which produce color images. Such films include direct-positive and negative-reversal films. An abbreviated illustration of such films is shown in cross section in FIG. 3. In general the film includes a structural support layer 80 comprised of paper fiber, polyethylene and other substances and a plurality of dyeforming layers or emulsions 82, 84 and 86. All colors to which the film is exposed may be resolved into one of the primary color constituents, that is red, blue or green. Each one of the emulsions records a different one of the primary color constituents that are found in the light spots which expose the emulsions. Thus, for example, the emulsion 82 may record all of the red constituents in any color component found in the light spot, the emulsion 84, all of the blue color constituents and the emulsion 86, all of the green color constituents. Couplers sensitive to the respective primaries are found in the respective emulsions, and upon exposure and subsequent developing cause the appropriate dyes to be formed in the layers.

For example, assuming that the fragment of film shown in FIG. 3 is a developed film, a dye representing all of the red constituents at one position in the plot may be found in the portion 90 of the emulsion 82, a dye representing all of the blue constituents in the portion 92 of emulsion 84 and a dye representing all of the green constituents in the portion 94 of emulsion 86. It will be observed that the portions 90 and 92 overlap which indicates that the color components of the light spot exposed on the film surface at the overlapping region of the portions included both red and blue constituents. On the other hand, the portion of film above portion 94 was exposed to a color having only green constituents. In actual use, the dyes in the developed film are the color complements or subtractive primaries cyan, yellow and magenta rather than the primary colors red, blue and green. In the discussion which follows, reference will be made to the dyes in terms of their primary colors for simplicity.

Let it be assumed that a fragmentary portion of a desired plot pattern appears on the developed film F as shown in FIG. 4. The pattern includes an element 100 in red, an element 102 in orange, and element 104 in purple and another element 106 in purple. Let it further be assumed that each element represents a conductive portion of a multi-layered microcircuit structure such as a transistor, and that all elements in one conductive layer are plotted in the same color. Thus, the elements 104 and 106 are in one conductive layer and the elements 100 and 102 are in two other conductive layers. A color plot such as illustrated in FIG. 4 might be used to check the alignment, positioning and isolation of the various elements when made from masks having the geometric pattern defined by the colors.

In making the color plot of FIG. 4 with a photoplotter such as described in connection with FIG. 1, a beam of light having red color components may first be projected onto the film as the film and photohead are moved relative to one another to produce the element 100. Thereafter, the element 102 may be generated by projecting a beam of light having an orange color component onto the film, and subsequently the elements 104 and 106 are generated by projecting a beam of light having a purple color component onto the film.

It is well known that all colors may be represented by different combinations of the additive primaries red, blue and green. Furthermore, in terms of the primary color constituents, the color orange consists primarily of red with a small portion of green, and the color purple consists of red and blue. Thus, each of the elements 100–106 illustrated in the plot contains red constituents with various admixtures of the other primaries. If each of these elements were plotted in isolation, the primary colors found in these elements would be recorded in the various emulsions of the film at one exposure level established by the photoplotter. However, when the elements are superimposed by the plotter on a single film, three separate plotting operations are required for each of the three colors and, correspondingly, certain portions of the film surface are subjected to multiple exposures. For example, the area in which the red and orange elements 100 and 102 are coincident is exposed twice and the areas in which the red and purple elements 100, 106 and 104 are coincident are exposed twice. More importantly, the shaded areas 110 and 112 of the plot define those areas which are exposed three times due to the coincidence of all three colors.

Since each one of the color components, red, orange and purple, includes a red primary constituent, and since the emulsions of the film record the plot in terms of the respective constituents, the emulsion layer recording the red constituents would be exposed three times at the shaded areas 110 and 112. If the capacity of the film emulsion recording the red constituents is not exceeded, then a sharp, clear and accurate representation of the elements 100–106 is formed. However, if the capacity of the emulsion is exceeded and becomes overexposed then the red dye in the overexposed emulsion tends to become bleached and bleeds beyond the geometric area exposed, and the developed film will present images such as shown in FIGS. 5 or 6.

FIG. 5 shows the image of the plot pattern that occurs when the emulsion layer defining red color constituents has been exposed beyond its capacity by the three different color components red, orange and purple found in the plotted elements 100–106.

The cumulative effect of the exposures causes the emulsion layer responsive to the red constituent to bleed beyond the shaded areas 110 and 112 in FIG. 4 and, therefore, merges and blurs the images in the shaded area 114 of FIG. 5.

It is relatively clear from FIG. 5 that the plotted image does not accurately represent the desired plot pattern shown in FIG. 4. Furthermore, the colors in the shaded area 114 may be partially bleached and would not be true representations of the intended colors of the plot pattern. The isolation of the purple elements 104 and 106 is not visible which is very critical in a microcircuit structure or other object that is depicted by the plot pattern.

FIG. 6 shows a further consequence of overexposure arising when the cumulative exposure of only two colors, red and orange in the elements 100 and 102, exceeds the capacity of the red emulsion of the film F. The enlarged shaded area 116 covers all of the overlapped region of the red and orange colors as well as contiguous portions of the elements 104 and 106 which suffer from triple exposure. Additionally, it will be noted that the long and narrow isolation strip between the elements 100 and 102 has lost its definition due to the mergence 118 of the red and orange colors.

The present invention overcomes the exposure problems illustrated in FIGS. 5 and 6 by limiting the cumulative exposure of each emulsion layer during the plotting process. The exposure is limited by restricting the plotted colors to those colors having color components which cumulatively lie within the exposure capacities of the respective emulsion layers in which the color components are recorded. Such restriction necessarily implies that an arbitrary selection of colors for the plot pattern cannot be made, or if such a selection is made initially, an analysis of the colors and their resulting effects must be performed to determine the effect of the colors on the film emulsions.

A determination of those colors to be use in the plot pattern may be carried out in a number of ways. For example, if it is made a rule of practise that no one color in a plot shall ever overlap itself, then the colors to be used in the plot pattern may be analysed on a worst-case basis, that is it is assumed that at some position in the plot pattern, all colors will fall in overlapping relationship. Each of the colors is then broken down into its primary color constituents which correspond to the three emulsion layers of the film, and the total exposure of each emulsion by the overlapped colors is examined to determine whether the exposure capacity of any one of the three emulsions is exceeded. If the analysis establishes that the exposure capacity is exceeded in any emulsion layer then the colors are modified or changed to reduce the primary constituent or constituents which violate those capacity limits. If no such violation is found, then the selected colors may be used.

The modification of the colors to avoid the overexposure condition may be made by changing any one of the three characteristics of a color, that is hue, lightness, or saturation. In the photoplotter 10 of FIG. 1, the color hue is changed by appropriate selection of the filters 42–56. If two or more filters are combined to produce a selected color, that selected color may be modified by removing or adding filters to the light beam projected onto the film surface. The saturation of a particular color may also be changed by means of the filters 42–56. For example, if two filters of like density and hue are positioned in the light beam, the densities are added and a deeper or more saturated version of the color is projected onto the film surface. Correspondingly that saturation or density can be reduced by moving one of the filters from the light beam. The lightness of a particular color can also be affected by means of the filters, or by adjusting the intensity of the light source 30 or by adjusting the positioning of the neutral density filter 60.

Accordingly when the analysis of the colors selected for the plot pattern establishes that any one of the emulsion layers will be over-exposed, the colors are modified to bring that exposure within the capacities of the emulsions.

Another method of analysing the colors comprises preprocessing the data defining the plot pattern in both geometry and color to locate the positions of the plot where more than one exposure of the film takes place, and then examining the color components at these locations to determine if in fact the color capacity of any one emulsion will be exceeded by those colors. If the capacity is exceeded, then appropriate modification of the colors must be made with the plotter 10 as described above. The preprocessing of the geometric and color data for actual coincidences is an operation which is well within the capability of modern data processing equipment and is a refinement of the analysis step above which merely assumes that all of the colors will overlap at some point in the plot pattern.

An example of the present invention is described below in connection with the plot patterns and colors described by FIGS. 4-6.

Let is first be assumed that the plot pattern illustrated in FIG. 4 has been reduced to digital or other machine-readable form with each element and color defined. The data is processed to check for any overlap of the colors. The shaded areas 110 and 112 are revealed as having a triple exposure of all three colors and certain of the other areas as having double exposure of two colors. Each of the color components in the various areas subjected to multiple exposures is then examined to determine if the primary color constituents which make up the color components exceed the exposure capacity of any one of the film emulsions. In the present example the red element 100 has, as a minimum, a red primary constituent in some degree of saturation. The orange element has a red primary constituent and a green primary constituent, and the purple elements 104 and 106 have a red primary constituent and a blue constituent. Thus, all three of the colors have a red primary constituent which leads to the possibility that the emulsion of the film sensitive to red colors may be over-exposed in the areas of double or triple overlap. To establish the exposure level, the amounts of the red constituent by percentage or other measure in each of the colors are added together for each area of overlap and the sum or cumulation of the components in each area is then compared with the capacity of the red sensitive emulsion of the film. Suitable color adjustments reducing the red constituents are made if that capacity is exceeded.

After the red constituents of the selected colors have been examined and adjusted if necessary, the blue and green primary constituents of the colors are examined for their effect on the film emulsions. Again color adjustments are made where necessary until it has been established that none of the emulsions of the film receives more cumulative exposure from the selected and adjusted colors than the emulsions can withstand.

Accordingly a method has been disclosed for plotting in multiple colors and obtaining plot patterns which accurately and faithfully represent the pattern and colors. The method results in a budgeting of the color components among the various emulsions of the film so that no one emulsion receives more exposure than its capacity.

While the present invention has been described in a preferred embodiment, it should be understood that numerous modifications and substitutions can be made without departing from the spirit of the invention. For example, FIG. 7 illustrates another type of photoplotter for carrying out the color plotting process with exposure budgeting. The plotter, generally designated 120, contains some components which are found in the plotter 10 of FIG. 1 and these components bear the same reference numerals. The principal difference between the plotters 10 and 120 is that the color adjustment is obtained in different fashions. In the plotter 10 a subtractive coloring technique uses separation filters 42-56 and a beam of polychromatic light containing substantially all of the color components. Certain of the color components are removed as the light beam passes through one or more of the filters.

On the other hand, the plotter 120 operates by an additive coloring process in which three individual light sources 122, 124 and 126 are separately controlled by an intensity circuit 128 in response to command signals from the controller 20. Three separate light beams for the additive primary color constituents red, green and blue are generated by the sources. The light beam from the source 122 is reflected by a red dichroic mirror 142 as a red beam along a beam axis 150 from an optical system 152 and produces a spot on the surface of the film F.

Similarly, green and blue light beams are projected by green and blue dichroic mirrors 144 and 146 associated respectively with the sources 124 and 126 so that the color of the light spot on the film represents the combination of the primary colors red, green and blue. By adjusting the intensity of the sources 122, 124 and 126, the ratio of the various primary colors projected onto the film, and correspondingly the resulting color of the spot on the film may be adjusted. Such adjustment is made in accordance with an analysis of the color components as described above. Of course, other specific methods of analysing the light may be used as desired without departing from the spirit of the invention.

Accordingly, the present invention has been described in several embodiments by way of illusration rather than limitation.

I claim:

1. A method of plotting with exposure budgeting comprising:

generating a spot of radiant energy on the photosensitive surface of a color film having emulsion layers variously sensitive to exposure by the color-defining components of the spot of radiant energy;

moving the spot of radiant energy and the color film relative to one another with prescribed motions to cause the spot to move to different positions on the photosensitive film surface and expose the desired plot on the film;

changing the color-defining components of the radiant energy in the generated spot to expose different colors in the photosensitive emulsion layers in the color film at different positions over which the spot is moved; and limiting the exposure of the film emulsion layers by the color-defining components at positions of the plot where the generated spot exposes the color film more than once with the same or different colors to prevent over-exposure of any one of the emulsion layers in the color film.

2. A method of plotting with exposure budgeting as defined in claim 1 wherein the step of limiting the exposure comprises restricting the plotted colors to colors having color defining components cumulatively within the exposure capacities of the associated emulsion layers at the positions of the plot where the generated spot exposes the color film more than once.

3. A method of plotting with exposure budgeting as defined in claim 1 wherein the step of limiting comprises:

selecting a limited group of colors for the plot pattern, each color having particular color-defining components in the spot of radiant energy exposing the film, the combined color-defining components of said group of colors not exceeding the exposure levels of any one of the emulsion layers in the color film.

4. A method of plotting with exposure budgeting as defined in claim 1 wherein:
the step of limiting the exposure of the film emulsion layers by the color-defining components includes limiting the adjustment of the color-defining components in the spot of radiant energy during each exposure of a position by the spot so that the cumulative exposure of any one emulsion layer does not exceed the maximum tolerable exposure of the layer.

5. A method of plotting with exposure budgeting as defined in claim 4 wherein the step of changing comprises:
generating one set of color-defining components in the spot of radiant energy when the spot is moved over said position the first time and generating another set of color components in the spot when the spot is moved over said position the second time.

6. A method of plotting with exposure budgeting as defined in claim 1 wherein the step of limiting comprises: analyzing the elements of the plot pattern before plotting in different color-defining components to establish the number of exposures expected for each emulsion layer at each position in the plot pattern, and adjusting the color-defining components of the spot to reduce the exposures where any one of the emulsion layers would be over-exposed.

7. A method of plotting with exposure budgeting as defined in claim 1 wherein the emulsion layers of the color film are respectively sensitive to primary color-defining constituents from which all other color-defining components of the generated spots are formed and the step of limiting the exposure of the film emulsion layers comprises restricting the total exposure of the emulsion layers individually by the respective primary color-defining constituents of the generated spots to prevent overexposure in any individual emulsion layer.

8. A method of plotting with exposure budgeting as defined in claim 1 wherein the step of limiting further includes analyzing all color-defining components of the spots of radiant energy at the positions exposed more than once for the primary color-defining constituents.

9. A method of plotting with exposure budgeting as defined in claim 1 wherein the step of limiting the exposure comprises selecting plotted colors having color-defining components cumulatively within the exposure capacity of the emulsion layers of the film.

10. A method of producing a color plot by means of a photoplotter which projects a spot of colored light onto a photosensitive film, comprising:
generating light beams of different colors in the photoplotter having a photosensitive color film supported in the plotter for exposure by the beams;
variably positioning the light beams of different colors and the color film within the photoplotter to shift the beams and photosensitive film relative to one another and expose the film in a plot pattern progressively including areas of different colors in overlapping relationship; and
controlling the colors in the light beams exposing the color film to prevent the limits of color capacity of the film from being exceeded in the areas of different colors in overlapping relationship.

11. A method of producing a color plot by means of a photoplotter as defined in claim 10 wherein:
the color film in the photoplotter has a plurality of photosensitive emulsions sensitive to different color-defining components of the generated light beams; and
the step of controlling comprises controlling the color-defining components of the light beams to prevent the limits of color capacity of each photosensitive emulsion from being exceeded.

12. A method of producing a color plot by means of a photoplotter as defined in claim 10 wherein the step of generating light beams of different colors for exposure of the film comprises generating a light beam of one color for exposure of one color in the film at one time, and generating a light beam of another color for exposure of another color in the film at another time.

13. A method of producing a color plot by means of a photoplotter as defined in claim 10 wherein the step of generating light beams of different colors comprises generating a polychromatic light and positioning color filters in the beam.

14. A method of producing a color plot by means of a photoplotter as defined in claim 10 wherein the steps of generating and controlling the colors in the light beams to prevent the limits of color capacity from being exceeded comprise positioning color filters of selected transmission densities in the polychromatic light beam.

15. A method of producing a color plot by means of a photoplotter as defined in claim 13 or 14 wherein the step of controlling the colors in the light beams comprises controlling the intensity of the colored light beams.

16. A method of producing a color plot as defined in claim 15 wherein the step of controlling the intensity comprises positioning a neutral density filter in one of the colored light beams.

17. A method of producing a multi-color plot on a color film by means of a projected light beam comprising:
generating information defining the geometry of the various elements of a desired color plot;
generating information defining colors selected for the various elements of the desired color plot;
comparing the geometric and color information to determine the anticipated exposures of the color emulsions in the color film by the selected colors;
identifying the anticipated exposures which exceed a predetermined limit in any one of the emulsions of the film;
modifying the selected colors to reduce the anticipated exposures in the color emulsions of the film below the predetermined limit; and
generating the color plot by moving the color film and a light beam projected onto the film relative to one another in accordance with the geometric information and by controlling the color of the light beam and exposure of the film in accordance with the modified colors.

18. A method of producing a multi-color plot on color film as defined in claim 17 wherein the step of modifying the selected colors to reduce the anticipated exposures in the emulsion comprises changing the hue of at least one of the selected colors.

19. A method of producing a multi-color plot on a color film as defined in claim 17 wherein the step of modifying the selected colors to reduce the anticipated exposures comprises reducing the lightness of at least one of the selected colors.

20. A method of producing a multi-color plot on a color film as defined in claim 17 wherein the step of modifying the selected colors to reduce the anticipated exposures comprises changing the saturation of at least one of the selected colors.

21. A method of producing a multi-color plot on a color film as defined in claim 17 wherein:
- the step of comparing comprises comparing the geometric and color information to determine locations in the desired plot at which the anticipated exposures of the color film exceed a predetermined limit; and
- the step of controlling comprises controlling the color of the projected light beam and exposure of the color film in accordance with the colors as modified at the geometrically limited locations identified in the step of comparing.

* * * * *